3,288,040
SOIL STABILIZATION
Raymond C. Burrows, Minneapolis, Minn., assignor to Archer-Daniels-Midland Company, Minneapolis, Minn., a corporation of Delaware
No Drawing. Filed Sept. 28, 1964, Ser. No. 399,908
11 Claims. (Cl. 94—25)

The present invention relates to a method for stabilizing soil. In another aspect, the present invention relates to soils which have been stabilized by the treatment thereof with certain inorganic materials.

Most natural, fine-grain soils, when compacted to a relatively high density at an appropriate water content, are capable of providing a firm roadway or runway that is quite satisfactory, for example, for many military operations in forward areas. The usefulness of such construction is limited, however, in that rain or other forms of precipitation, even in moderate amounts, can make the surface of such a roadway muddy, slippery, and perhaps impassable for even the simplest type of military operation. Additionally, excessive dust may develop during dry weather through the abrading action of traffic on unsurfaced soil, and this dust can significantly impede operations. Even relatively small amounts of dust can greatly increase maintenance requirements for engines and other mechanisms and, although the dust conditions seldom become so severe as to prohibit operations completely, they may reduce visibility to the point that operations become hazardous. Witness, for example, the tremendous dust problems generated by Operation Desert Strike held on the California-Arizona border in May, 1964.

Consequently, an agent or material that could be readily applied to soil to render it immune to the damaging effects of water, desiccation, and traffic abrasion would be of material value to the military, as well as to private industry. The essential requirement for such a material is that it be capable of imparting an adequate stability condition to soil, in terms of water and/or dust resistance. Improvement of soil strength characteristics, although desirable, is not the primary objective. It is desirable that a treatment with such a waterproofing and/or dustproofing material be effective when it is present in a relatively thin layer of surface soil, preferably not exceeding six inches. Ideally, the material should be effective when a small amount of it is mixed with soil, e.g., below ten percent by weight, based on the weight of the soil. This latter requirement presupposes that the surface layer of soil (e.g., the top four inches) is removed from the area of operations, mixed with the soil stabilizing material, and then replaced.

Although the need for materials of this type will vary in terms of required effectiveness, current military requirements for waterproofing and dustproofing materials have been revised to conform with more recently developed operational concepts in the theatre of operations. In accordance with these revisions, materials are now required which will be effective for anticipated design life periods ranging from a minimum of two weeks to a maximum of six months, depending upon the operational function. Ideally, a material for use in military operations would be one that could be applied by a simple surface treatment, rather than by physical removal of the surface layer of soil followed by mixing the removed soil with the treating material, and then reapplying the treated soil. This latter goal (i.e., surface treatment) although advantageous, is not considered by the military to be an essential requirement (at the present time) in view of the lack of success of prior experimentation in developing such a system.

Since 1945, the military have conducted experiments and investigations of available dustproofing and waterproofing materials. These investigations were precipitated by war-time experiences with dust and mud at air bases surfaced with pierced steel landing mats. Since that time, the U.S. Army Engineer Waterways Experiment Station (Vicksburg, Mississippi) has conducted numerous experiments, including both laboratory and field studies, of waterproofing and dustproofing materials. These studies and others have resulted in conclusions that aniline-furfural resins are the most promising soil stabilizing materials developed to date. This, and other work, has indicated that urea-furfural, phenol-furfural, and phenol-formaldehyde mixtures are among the many ineffective soil-stabilizing agents. As a result, special emphasis has been placed, in recent years, upon the development of soil-stabilizing materials formed by the reaction of aniline and furfural.

Unfortunately, aniline-furfural resins, while reasonably effective, possess certain very undesirable characteristics. The single most important undesirable characteristic of these resins is the extreme toxicity which accompanies the use of aniline. Additionally, the cost of these materials is higher than desired.

It has now been discovered, and this discovery forms a basis for the present invention, that soil may be stabilized by applying soil-stabilizing amounts of alkali metal silicate and alkali metal hexafluorosilicate to the surface of the soil. These two ingredients react in the presence of a soil-stabilizing amount of water to form a water-insoluble, infusible mass. The reaction involved is believed to proceed according to the following generalized chemical reaction:

$$M_2O \cdot nSiO_2 + M_2SiF_6 + H_2O \rightarrow (n+1)SiO_2 + 4MF + 2HF$$

wherein each M represents an alkali metal, preferably lithium, sodium or potassium. In the most preferred embodiment, the metal component of both silicates is sodium. In the equation, $n$ is a number, usually from 1 to 5, e.g., 2. In practice, the $SiO_2$ formed by this reaction is a water-insoluble, infusible mass. The HF produced by the reacting seems to react, immediately, with other compounds, probably forming a fluoride salt as an eventual product. Thus it can be appreciated that the reaction represented above is, of necessity, generalized and that the actual reaction is undoubtedly more complex.

Use of the present soil-stabilizing technique has numerous advantages. First, the present soil treatment is effective as a dustproofing and waterproofing aid. Second, the preferred silicate materials are inexpensive. Third, none of the silicate materials involved are toxic, and thus their use does not involve any known health hazards. Fourth, none of the silicates are flammable, and thus fire hazards are eliminated. Fifth, the reaction involved requires the presence of free water, i.e., water available as such and not as water by hydration. In dry soil this water must be added, but in moderately wet soils, it is possible to merely add a dry soil-stabilizing amount of the two silicate ingredients to the soil. The resulting chemical reaction forms a water-insoluble, infusible mass which consumes water and thus dries the soil to some degree and stabilizes it at the same time. The reaction will proceed under ambient conditions, although elevated temperatures (e.g., as created by applying heat) accelerate the reaction. The rate of set-up is also accelerated by the addition of a suitable water-soluble base. Suitable bases include the inorganic bases such as the alkali metal hydroxides, as well as the alkaline earth metal hydroxides. Alternatively, the corresponding oxides may be used. For example, lime may be used. Sodium orthosilicate, which acts as both a base and as an additional source of silica, may be used and is preferred for some applications. If desired, mixtures of base may be employed. The preferred bases are generally sodium hydroxide and potassium hydroxide. Sodium hydroxide is the most preferred base. The bases may be used as a solid, or as an aqueous solution.

It has been found that the present soil-stabilizing technique can be employed in a variety of manners. First, the conventional technique of soil removal, followed by mixing the necessary silicates with the removed soil, and then reapplying the removed soil to the ground may be employed. As previously indicated, water already present in a wet or moist soil may be used to provide part or all of the necessary water of reaction. Alternately, water may be mixed with the removed soil, or the soil may be replaced and then sprayed or otherwise contacted with water. Too much water should be avoided since it will swamp the silicates and inhibit the formation of the desired stability condition. As a practical guide, care should be taken not to flood the treated surface. Likewise, flooded surfaces should be allowed to drain before applying the silicates.

Another method of treatment is to apply a dry mixture of metal silicate (e.g., potassium silicate) and metal hexafluorosilicate (e.g., lithium hexafluorosilicate) to the surface of the soil. Water can then be added, or, if the mixture has been applied to a wet soil surface, it will rapidly absorb water and allow the desired reactions to take place and thus stabilize the area.

Alternately, an aqueous mixture of the silicate ingredients may be sprayed or otherwise contacted with the soil. In a further alternate embodiment, it is possible to mix the metal silicate, together with the metal hexafluorosilicate and suitable base (e.g., sodium hydroxide), with water. This material may then be applied to the surface of the soil or otherwise contacted with the soil and allowed to set-up. By way of example, a 50/50 mixture, by weight, of solid sodium hexafluorosilicate ($Na_2SiF_6$) and solid sodium silicate (e.g., Philadelphia Quartz product G) can be mixed with a sufficient amount of an aqueous solution of sodium hydroxide (e.g., 1 N) to form a soft, white putty-like material. This soft material solidifies in about 1 to 2 minutes when heated to 210–212° F. On the other hand, this same soft, pliable material is stable for about two hours at room temperature.

Since the presently involved reaction requires the presence of water, and since heat accelerates the rate of reaction, a very convenient and preferred method for stabilizing a soil is to first apply, for example, sodium hexafluorosilicate and sodium silicate to the soil surface and then contact the soil surface with live steam. In this manner, it is possible to rapidly stabilize the soil.

It has been further discovered that this same reaction may be employed to form construction materials. That is to say, significantly greater amounts, e.g., a solidifying amount of up to 40 percent, or even 60 weight percent, of the two primary silicate ingredients may be mixed with soil or sand or other aggregate and the resulting mixture allowed to set. If the mixture is suitably confined while it is setting up, rigid structures can be obtained that can be used as building blocks, etc.

In practicing the present invention, it has been found that mixtures of the metal silicate and metal hexafluorosilicate (the two primary ingredients) containing from 5 to 90 percent by weight of metal silicate are the most effective (said percentages being based on the combined dry weight of the two silicates). More preferably, from 10 to 80 weight percent, e.g., 20 to 70 weight percent alkali metal silicate is employed. A particularly effective mixture will contain from 25 to 60 weight percent metal silicate, e.g., 45 weight percent, with the remainder being metal hexafluorosilicate.

Since the rate of reaction can be controlled by regulating the amount of water present, the amount of water employed may vary over wide ranges. However, as previously indicated, flooding should be avoided. Where steam is employed, precise determination of the amount of water actually used is difficult, since much of the steam may be lost to the atmosphere without ever participating in the stabilizing reaction. In this respect, the examples hereinafter described should provide those skilled in the art with sufficient direction to enable them to practice the present invention.

The amount of added metal base used to increase the rate of reaction can also vary over wide ranges. Ordinarily, however, it has been found desirable to employ from 5 to 200 parts by weight of metal base per 100 parts by weight of the mixture of metal silicate and metal hexafluorosilicate. More usually, from 10 to 100 parts by weight of metal base will be employed (calculated as weight of a one molar aqueous solution of the base). As previously indicated, a portion of the water, or all of the water, can be used in the form of aqueous solutions of the metal base or aqueous solutions of the silicates.

Hexafluorosilicates ($M_2SiF_6$) are readily available, commercially, in substantially pure form. Sodium hexafluorosilicate, the preferred member of this class, is a white, crystalline solid having a specific gravity of 2.7. It is only slightly soluble in water and is very inexpensive. It is not necessary to use the metal hexafluorosilicates in pure form. Also, mixtures of hexafluorosilicates may be used. The "hexafluorosilicates" are sometimes referred to as "fluorosilicates" and, very commonly, as "silicofluorides."

Metal silicates of the general formula $M_2 \cdot nSiO_2$ are quite well-known materials that are commercially available from such suppliers as, for example, the Philadelphia Quartz Company. They are sold as powders (anhydrous or hydrated) and as syrup-like solutions in water. Typically, the weight ratio of $M_2O/SiO_2$ in commercial silicates ranges from 1:1 to 1:5, more usually from 1:1.5 to 1:4, e.g., 1:2. The syrupy solutions frequently contain from 35 to 80 weight percent water, e.g., 45 to 70 weight percent water. Hydrated sodium silicate powders usually contain about 17.5 weight percent water, although other hydrates are known. Mixtures of silicates may be used.

In evaluating waterproofing and dustproofing materials, a specially prepared soil is frequently used. Ordinarily, the soil to be used is air-dried, pulverized and screened through a #4 U.S. Standard sieve, and thoroughly mixed to achieve uniformity. Water is then added to the soil to achieve an initial water content of 10 weight percent (based on soil weight) which is comparable to that used in both the laboratory and field investigations conducted by the Federal Government. The soil and water are thoroughly mixed and then placed in air-tight containers to equilibrate for at least 24 hours at the ambient temperature. At the end of that time, the soil is ready for use. Unless otherwise indicated, soil used in the examples and referred to as "specially prepared soil" is prepared in this manner.

In a broad sense, "dust" may be defined as soil and other material which has become airborne. In this connotation, no attempt is made in the following examples to establish a limit of particle size that may be considered dust, since this is a function of numerous factors, the most important of which are probably wind and vehicle velocities. In this disclosure, the term "abraded material" is used in lieu of the term "dust." Abraded material refers to the total amount of loose material worn away or otherwise eroded from the test surface by the action of the elements and test traffic. For surfaces constructed predominantly of silt and clay-sized particles, virtually all of the material that is broken away from the soil surface can be considered a "dust" potential. Even though the loose material may consist of agglomerations of small particles held together as a result of treatment or compaction, the action of repetitive traffic will eventually reduce them to a fineness approaching that of the individual soil grains.

Dustproofing effectiveness may be measured by masking out any selected area with, for example, a polyethylene sheet provided with an open window. Then, the abraded material is removed from the area within the window by means of a conventional vacuum cleaner, using a clean bag for each test area. The weight of abraded material thus removed and deposited in the bag provides a measure of the dustproofing effectiveness of the stabilizing material.

The present invention is further illustrated by the following examples which include a preferred embodiment. Unless otherwise indicated, all parts are by weight and all percentages are weight percentages.

*Example 1*

Five parts of dry, solid, sodium hexafluorosilicate powder (substantially pure) and five parts of dry, solid, sodium silicate powder (19.4% sodium oxide, 62.5% silicon dioxide, remainder being water; Philadelphia Quartz product G) are intimately mixed. To this mixture is added four parts of 1 N aqueous sodium hydroxide. The resulting mixture is a soft, white, plastic material. This formulation solidifies in a few minutes when heated to a temperature of about 210–212° F. on a steam bath. This same formulation is stable at room temperature for several hours.

Five parts of this same plastic formulation is intimately mixed with 95 parts of common white silica sand. This sand-containing mixture is then spread over an exposed area of ground, compacted with a lawn roller and allowed to set. Its water and dust resistance are compared at various intervals with a similarly prepared, untreated, sand surface. The treated sand shows greater water resistance and produces less abraded material after exposure to the elements for a period of time (e.g., one month).

*Example 2*

Four parts of sodium hexafluorosilicate (substantially pure) and four parts of sodium silicate (same silicate as Example 1) are mixed with 92 parts of dry soil (moisture below 1 weight percent) which has been pulverized and screened through a #4 U.S. Standard sieve. This mixture is then spread over an exposed soil surface to a depth of six inches and compacted with a lawn roller. Low pressure steam (30 p.s.i.g.) is then sprayed over the compacted area to cause it to set. The steam nozzles are maintained three inches above the soil level. For comparative purposes, a duplicate specimen is prepared using untreated soil, the same degree of compaction, and no steam treatment. Both specimens are exposed to ordinary atmospheric conditions. Significantly, less abraded material appears during a five-week period on the treated sample, when compared with the untreated sample. Further, visual inspection will show that the treated soil does not become a slippery or muddy as a result of a light rain as does the untreated soil.

*Example 3*

Ten parts of sodium hexafluorosilicate powder and twenty parts of aqueous sodium silicate (Philadelphia Quartz product N; 8.9% $Na_2O$, 28.7% $SiO_2$, and 62.4% water) are mixed and sprayed over a test area formed from specially prepared soil. The surface sets within minutes when heated with infra-red lamps. Areas not similarly heated set-up in about 2 hours at 75° F. The treated soil is shown to be more water resistant and more abrasion resistant than untreated soil. The advantageous properties are still apparent after two weeks.

The mixture of silicates prepared in this example will cure to form a hard cake when heated on a steam bath for 5–6 minutes. Working life at room temperature is about 20 minutes and the mixture will set-up in about 2 hours at room temperature.

*Example 4*

Ten parts of granular sodium hexafluorosilicate, eight parts of 1 N aqueous sodium hydroxide, and ten parts of powdered sodium silicate (Philadelphia Quartz product G; 19.4% $Na_2O$, 62.5% $SiO_2$ and 17.5% water) are intimately mixed. This mixture cures to form a hard cake when heated several minutes on a steam bath. When the uncured mixture is spread over loose soil to a depth just sufficient to give the visual appearance of complete cover, it sets up in several hours to provide a substantially improved soil condition. Water and dust resistance are noticeably increased.

*Example 5*

Ten parts of granular sodium hexafluorosilicate, ten parts of powdered sodium silicate (product G of Example 4), five parts of aqueous sodium silicate (Philadelphia Quartz product C; 18% $Na_2O$, 36% $SiO_2$, and 46% water), and six parts of a 50 percent aqueous solution of sodium orthosilicate ($Na_4SiO_4$) are intimately mixed to form a good working paste which cures to form a hard, strong cake in several minutes at 210–212° F. This mixture may be mixed with a thin layer of surface soil and then cured with steam. The treated soil is shown to be more dust and water resistant than untreated soil.

*Examples 6–11*

Results similar to those obtained in Examples 1–5 can be obtained by using, as the primary ingredients, any of the following combinations:

(6) Ten parts of powdered sodium hexafluorosilicate and ten parts of aqueous sodium silicate (Philadelphia Quartz product S–35; 6.75% $Na_2O$, 25.3% $SiO_2$, and 67.9% water).

(7) Ten parts of granular sodium hexafluorosilicate and ten parts of aqueous sodium silicate (product N of Example 3).

(8) Ten parts of granular sodium hexafluorosilicate and ten parts of aqueous sodium silicate (product C of Example 5).

(9) Ten parts of granular sodium hexafluorosilicate and ten parts of aqueous sodium silicate (Philadelphia Quartz product B–W; 19.5% $Na_2O$, 31.2% $SiO_2$, and 49.1% water).

(10) Ten parts of granular potassium hexafluorosilicate and ten parts of aqueous sodium silicate (product N of Example 3).

(11) Ten parts of granular potassium hexafluorosilicate and twenty parts of aqueous potassium silicate (Philadelphia Quartz product Kasil No. 1; 7.8% $K_2O$, 19.5% $SiO_2$, and 72.4% water).

In using the compositions of Examples 6–11, to stabilize soil, it may be desirable or necessary to add water, heat or metal base to achieve a desired level of soil stabilization within a given period of time.

*Example 12*

To form a self-supporting structure suitable for use as a building material, ten parts of powdered sodium hexafluorosilicate, ten parts of aqueous sodium silicate (product N of Example 3), and twenty parts of 100 mesh white silica sand are mixed and compacted in a wooden mold to form a rectangular-shaped mass which sets up at 210–212° F. in less than one hour.

*Example 13*

Five parts of powdered sodium hexafluorosilicate, five parts of sodium silicate (product G of Example 4), about eight parts of a 50 percent aqueous solution of sodium orthosilicate, and forty parts of 70–100 mesh silica sand are mixed and then compacted in a wooden mold to form a rectangular-shaped mass which sets up at 110° C. in about one-half hour. The resulting product is a hard, dense block suitable for use as a building material.

From the foregoing description and examples, it will be appreciated that a novel approach to soil stabilization has been developed. This approach is simple, effective, inexpensive, non-toxic, non-flammable and versatile.

Having described the present invention with a certain degree of particularity, it will be realized that numerous minor changes and variations, falling within the spirit and scope of this invention, will become obvious to those skilled in the art. It is not intended that this invention be limited to any of the materials which have been mentioned as specific examples nor by the specific proportions which have been given for the sake of illustration, but it is intended to claim all novelty inherent in the invention, as well as all modifications and variations coming within the spirit and scope of the invention.

What is claimed is:

1. A method for stabilizing soil which comprises contacting soil with soil-stabilizing amounts of alkali metal silicate and alkali metal hexafluorosilicate in the presence of water.

2. A method of the type described in claim 1 wherein said metal silicate comprises sodium silicate.

3. A method of the type described in claim 1 wherein at least a portion of said water is provided in the form of steam.

4. A method of the type described in claim 1 wherein said contacting is performed by removing soil from the ground, mixing said soil with said metal silicate and said metal hexafluorosilicate, and then applying the resulting mixture to a surface of the ground.

5. A method of the type described in claim 1 wherein at least a portion of said water is provided by wet soil.

6. A method of the type described in claim 1 wherein heat is supplied to accelerate the rate at which the soil is stabilized.

7. A method of the type described in claim 1 wherein a water soluble base is used to accelerate the rate at which the soil is stabilized.

8. A stabilized soil characterized by having a surface thereof treated, in the presence of water, with alkali metal silicate and alkali metal hexafluorosilicate.

9. A shaped structure comprised of aggregate bonded together with the reaction product of a solidifying amount of a mixture of alkali metal silicate and alkali metal hexafluorosilicate, said reaction product being formed in the presence of water.

10. A shaped structure of the type described in claim 9 wherein said alkali metal is sodium and wherein said aggregate is sand.

11. A method for stabilizing soil which comprises forming a mixture of sodium silicate and sodium hexafluorosilicate; said sodium silicate comprising 25–60 weight percent of the combined weight of said sodium silicate and sodium hexafluorosilicate; said sodium silicate comprising $Na_2O$ and $SiO_2$ in a weight ratio of from 1:1 to 1:5; contacting said soil with said mixture in the presence of a soil stabilizing amount of water under non-flooding conditions, and thereby effecting a stabilized condition in said soil.

References Cited by the Examiner

UNITED STATES PATENTS

| | | | |
|---|---|---|---|
| 1,995,598 | 3/1935 | Archibald | 94—25 |
| 2,227,653 | 1/1941 | Langer | 61—36 |
| 2,437,387 | 3/1948 | Hodgson | 94—25 X |
| 2,968,572 | 1/1961 | Peeler. | |
| 3,012,405 | 12/1961 | Caron | 61—36 |

FOREIGN PATENTS 393,135  10/1908  France.

JACOB L. NACKENOFF, *Primary Examiner.*